(12) United States Patent
Jeon et al.

(10) Patent No.: US 12,122,404 B2
(45) Date of Patent: Oct. 22, 2024

(54) VEHICLE AND ACCELERATION LIMIT CONTROL METHOD THEREFOR

(71) Applicants: Hyundai Motor Company, Seoul (KR); Kia Corporation, Seoul (KR)

(72) Inventors: Sung Bae Jeon, Gyeonggi-do (KR); Sung Il Jung, Busan (KR); Hui Un Son, Gyeonggi-do (KR); Gyu Ri Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 288 days.

(21) Appl. No.: 17/889,954

(22) Filed: Aug. 17, 2022

(65) Prior Publication Data

US 2023/0059643 A1  Feb. 23, 2023

(30) Foreign Application Priority Data

Aug. 19, 2021  (KR) .......... 10-2021-0109467

(51) Int. Cl.
*B60W 50/12* (2012.01)
*B60W 50/10* (2012.01)

(52) U.S. Cl.
CPC ............ *B60W 50/12* (2013.01); *B60W 50/10* (2013.01); *B60W 2510/0638* (2013.01); *B60W 2552/53* (2020.02); *B60W 2554/4049* (2020.02)

(58) Field of Classification Search
CPC ................ B60W 50/12; B60W 50/10; B60W 2510/0638; B60W 2552/53; B60W 2552/05; B60W 2554/4049; B60W 2520/10; B60W 2520/105; B60W 2540/043; B60W 2540/10; B60W 2556/50; B60W 2720/106; B60W 30/143; B60W 30/18163; B60W 40/02; B60W 40/107; B60W 2050/0008; B60W 2050/0012; B60W 2050/0022; B60K 26/021
USPC ....................................... 701/36, 70
See application file for complete search history.

(56) References Cited

FOREIGN PATENT DOCUMENTS

| KR | 10-1103528 B1 | 1/2012 |
| KR | 10-1245101 B1 | 3/2013 |
| KR | 10-1360039 B1 | 2/2014 |
| KR | 10-1415208 B1 | 8/2014 |
| KR | 10-1469670 B1 | 12/2014 |
| KR | 10-2015-0061781 A | 6/2015 |
| KR | 10-1693847 B1 | 1/2017 |
| KR | 10-1694016 B1 | 1/2017 |
| KR | 10-1837393 B1 | 4/2018 |
| KR | 10-1907332 B1 | 10/2018 |
| KR | 10-2019-0070552 A | 6/2019 |
| KR | 10-2022-0040102 A | 3/2022 |

*Primary Examiner* — Hai H Huynh
(74) *Attorney, Agent, or Firm* — Fox Rothschild LLP

(57) ABSTRACT

Disclosed are a vehicle capable of controlling acceleration in consideration of a driving environment and an acceleration limit control method therefor. The acceleration limit control method of the disclosure includes determining a base value of an acceleration limit level, which is classified into a plurality of levels, determining a first correction value based on manipulation of an accelerator pedal, determining a second correction value based on a driving environment, determining a final acceleration limit level by applying the first correction value and the second correction value to the base value, and determining a limit acceleration based on the final acceleration limit level.

19 Claims, 9 Drawing Sheets

VEHICLE AND ACCELERATION LIMIT CONTROL METHOD THEREFOR

CROSS-REFERENCE TO RELATED APPLICATIONS

This application claims under 35 U.S.C. the benefit of Korean Patent Application No. 10-2021-0109467, filed on Aug. 19, 2021, which is hereby incorporated by reference as if fully set forth herein.

BACKGROUND

Field

The present disclosure relates to a vehicle capable of controlling acceleration in consideration of a driving environment and an acceleration limit control method therefor.

Discussion of the Related Art

Speed limit devices are safety driving systems that limit acceleration so that a driver drives a vehicle at a speed that does not exceed a predetermined speed limit so as to prevent speeding. As a representative example of the speed limit devices, a manual speed limit assist (MSLA) function may be used.

In general, during execution of the MSLA function, braking control for deceleration is not performed, and thus a vehicle may accelerate higher than a predetermined speed when traveling downhill. In addition, the relative position and speed of a preceding vehicle are not considered, unlike smart cruise control (SCC), and thus a driver must monitor the road ahead.

Recently, functions such as camera-based SLA (CSLA) using speed limit information recognized through a front camera and intelligent SLA (ISLA) using speed limit information from a navigation system have been developed and applied.

These speed limit devices are defined in SAFETY ASSIST—SPEED ASSIST SYSTEM—SPEED CONTROL FUNCTION, among assessment items of the European new car assessment program (EURO NCAP).

However, acceleration also needs to be considered when the above-described speed limit function is executed. For example, according to automatically commanded steering function (ACSF) regulations, the lateral acceleration of a vehicle is limited to a maximum of 3 m/s$^2$ during autonomous driving or cruise control driving. In order to meet this requirement, acceleration limit devices have been proposed.

However, conventional acceleration limit devices are designed to limit acceleration to a predetermined value in all cases without considering driver acceleration intention or a road environment.

SUMMARY

Accordingly, embodiments of the present disclosure disclosure is directed to a vehicle and an acceleration limit control method therefor that substantially obviate one or more problems due to limitations and disadvantages of the related art.

Embodiments described herein provide a vehicle having an improved acceleration limit function and an acceleration limit control method therefor.

Particularly, embodiments described herein provide a vehicle capable of limiting acceleration in consideration of a driving environment as well as a predetermined set value and an acceleration limit control method therefor.

However, objects to be accomplished by the present disclosure are not limited to the above-mentioned objects, and other objects not mentioned herein will be clearly understood by those skilled in the art from the following description.

In order to accomplish the above and other objects, an acceleration limit control method according to an embodiment of the present disclosure includes determining a base value of an acceleration limit level, which is classified into a plurality of levels, determining a first correction value based on manipulation of an accelerator pedal, determining a second correction value based on a driving environment, determining a final acceleration limit level by applying the first correction value and the second correction value to the base value, and determining a limit acceleration based on the final acceleration limit level.

For example, the determining a base value may include determining the base value according to a setting for each driver when a drive mode corresponds to a predetermined mode.

For example, the determining a first correction value may include determining a 1-1$^{st}$ correction value according to an accelerator pedal position sensor (APS) value and determining a 1-2$^{nd}$ correction value according to a variation (AAPS) in the accelerator pedal position sensor value.

For example, the determining a second correction value may be performed based on at least one of whether the current driving road corresponds to a specific road type, whether the current driving lane is a passing lane, or whether road congestion is greater than a threshold value.

For example, the determining a second correction value may include increasing the second correction value when the current driving road corresponds to the specific road type, when the current driving lane is not a passing lane, and when the road congestion is greater than the threshold value.

For example, the acceleration limit control method may further include turning off an acceleration limit function when an acceleration limit off determination is made in at least one of the determining a base value, the determining a first correction value, or the determining a second correction value.

For example, the acceleration limit control method may further include determining a limit torque satisfying the limit acceleration based on a disturbance torque caused by a disturbance other than a driving source of a vehicle and determining an output torque to be output from the driving source based on the limit torque and a driver demand torque.

For example, the determining a disturbance torque may include obtaining a feedback disturbance torque based on the output torque and a vehicle speed, obtaining a feedforward disturbance torque based on a slope, and determining the disturbance torque based on the feedback disturbance torque and the feedforward disturbance torque.

For example, the determining the disturbance torque based on the feedback disturbance torque and the feedforward disturbance torque may include multiplying the feedback disturbance torque by a gain determined according to a vehicle speed and multiplying the feedforward disturbance torque by a value obtained by subtracting the gain from 1.

In addition, a vehicle according to an embodiment of the present disclosure disclosure includes a driving source, a torque calculation controller configured to determine a limit acceleration and to determine an output torque to be output from the driving source based on the determined limit acceleration, and a driving source controller configured to control the driving source based on the output torque. The torque calculation controller includes a first determination unit configured to determine a base value of an acceleration limit level, which is classified into a plurality of levels, a second determination unit configured to determine a first correction value based on manipulation of an accelerator pedal, a third determination unit configured to determine a second correction value based on a driving environment, and a calculation unit configured to determine a final acceleration limit level by applying the first correction value and the second correction value to the base value and to calculate the limit acceleration based on the final acceleration limit level.

For example, the first determination unit may determine the base value according to a setting for each driver when a drive mode corresponds to a predetermined mode.

For example, the second determination unit may determine the first correction value based on the sum of a $1\text{-}1^{st}$ correction value according to an accelerator pedal position sensor (APS) value and a $1\text{-}2^{nd}$ correction value according to a variation (AAPS) in the accelerator pedal position sensor value.

For example, the third determination unit may determine the second correction value based on at least one of whether the current driving road corresponds to a specific road type, whether the current driving lane is a passing lane, or whether road congestion is greater than a threshold value.

For example, the third determination unit may increase the second correction value when the current driving road corresponds to the specific road type, when the current driving lane is not a passing lane, and when the road congestion is greater than the threshold value.

For example, the calculation unit may turn off an acceleration limit function when at least one of the first determination unit, the second determination unit, or the third determination unit makes an acceleration limit off determination.

For example, the torque calculation controller may determine a limit torque satisfying the limit acceleration based on a disturbance torque caused by a disturbance other than the driving source, and may determine the output torque based on the limit torque and a driver demand torque.

For example, the torque calculation controller may obtain a feedback disturbance torque based on the output torque and a vehicle speed, may obtain a feedforward disturbance torque based on a slope, and may determine the disturbance torque based on the feedback disturbance torque and the feedforward disturbance torque.

For example, the torque calculation controller may determine the disturbance torque based on a value obtained by multiplying the feedback disturbance torque by a gain determined according to a vehicle speed and a value obtained by multiplying the feedforward disturbance torque by a value obtained by subtracting the gain from 1.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the embodiments described herein. In the drawings.

DETAILED DESCRIPTION OF THE INVENTION

Figure 1:
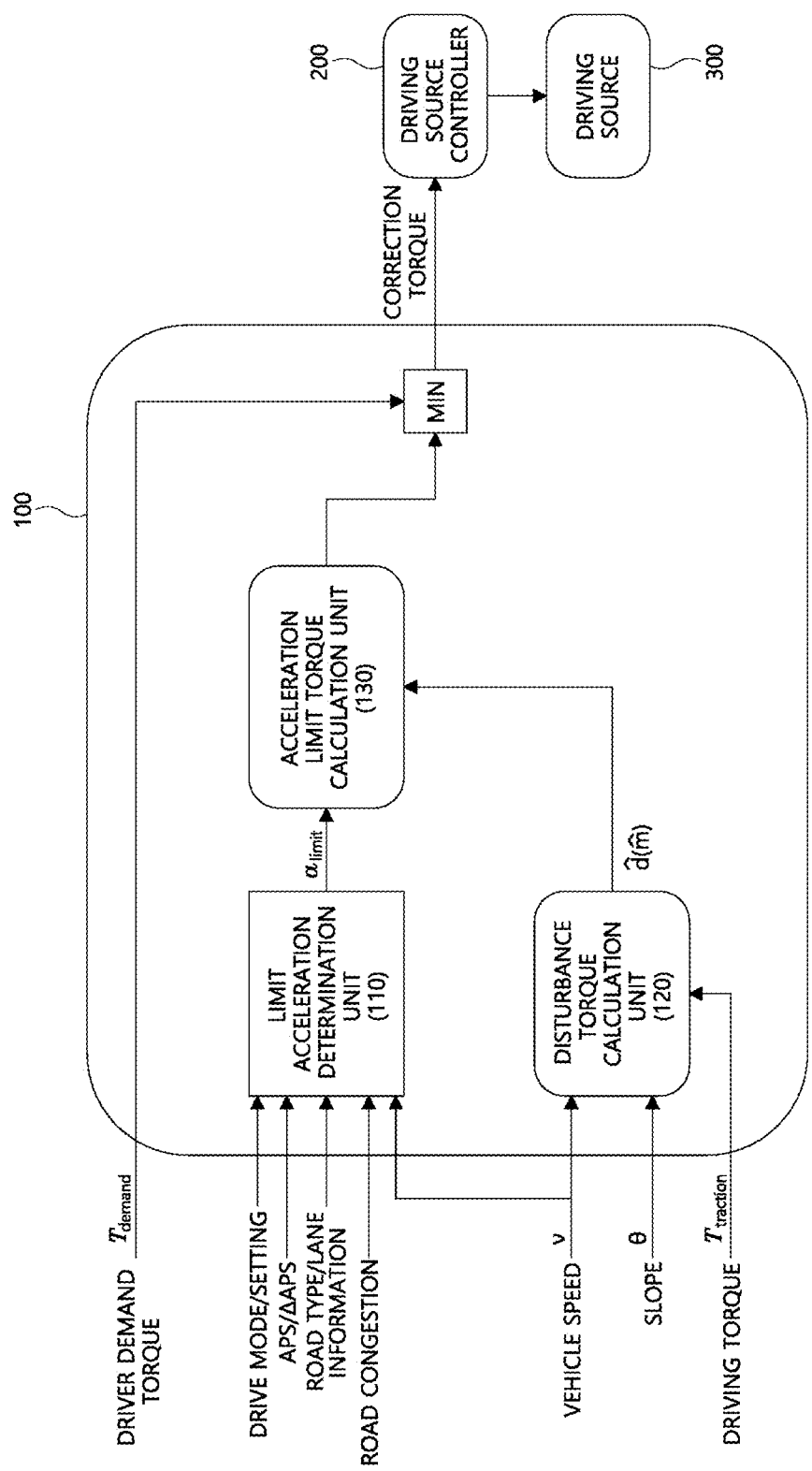
FIG. 1 illustrates an example of the configuration of a vehicle having an acceleration limit device according to an embodiment of the present disclosure.

Hereinafter, embodiments of the present disclosure will be described in detail with reference to the accompanying drawings so that those skilled in the art may easily carry out the embodiments. The present invention may, however, be embodied in many different forms, and should not be construed as being limited to the embodiments set forth herein. In the drawings, parts irrelevant to the description of the present invention will be omitted for clarity. Like reference numerals refer to like elements throughout the specification.

Throughout the specification, when a certain part "includes" or "comprises" a certain component, this indicates that other components are not excluded, and may be further included unless otherwise noted. The same reference numerals used throughout the specification refer to the same constituent elements.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components.

As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

The term "unit" or "control unit" forming part of the name of the motor control unit (MCU) or the hybrid control unit (HCU) is merely a term that is widely used in naming a controller for controlling a specific function of a vehicle, and should not be construed as meaning a generic function unit. For example, in order to control the function peculiar thereto, each control unit may include a communication device, which communicates with other control units or sensors, a memory, which stores therein an operating system, logic commands, and input/output information, and one or more processors, which perform determinations, calculations, and decisions necessary for control of the function peculiar thereto.

According to an embodiment of the present disclosure, when an acceleration limit function is activated, a limit acceleration is determined in comprehensive consideration of a basic setting, a driver's acceleration intention, and a driving environment. The result obtained based on the basic setting, the driver's acceleration intention, and the driving environment may be determined in the form of one of a plurality of acceleration limit levels, and the determined acceleration limit level may be converted into an acceleration value corresponding thereto. In the following description, for convenience, the acceleration limit level may be set within a range from 0 to 5, and the situation in which the acceleration limit level is 0 may be the situation in which the acceleration limit function is not activated. In addition, when the acceleration limit level ranges from 1 to 5, setting may be made such that the acceleration limit is gradually increased from level 1 to level 5, and thus acceleration is gradually lowered. However, this level classification and the extent to which acceleration is limited are merely exemplary, and the invention is not limited thereto.

FIG. 1 illustrates an example of the configuration of a vehicle having an acceleration limit device according to an embodiment of the present disclosure.

Referring to FIG. 1, a vehicle according to an embodiment may include a driving source 300, a torque calculation controller 100, which calculates a correction torque obtained by applying an acceleration limit to a driver demand torque in the state in which acceleration limit control is activated, and a driving source controller 200, which controls the driving source 300 to output the correction torque calculated by the torque calculation controller 100.

Here, the driving source 300 may be an internal combustion engine, a motor, or a combination of an internal combustion engine and a motor (e.g. a driving source for use in a hybrid electric vehicle). However, this is merely exemplary, and the invention is not limited thereto. Any type of driving source may be used, so long as the same is capable of transmitting driving force to wheels.

The driving source controller 200 may be, for example, an engine management system (EMS), a motor control unit (MCU), or the like, depending on the type of driving source.

The torque calculation controller 100 may be configured as a controller physically separate from the driving source controller 200, or may be configured to perform one function of the driving source controller 200. When configured as a separate controller, the torque calculation controller 100 may be configured in the form of a higher-level controller of the driving source controller 200, such as a hybrid control unit (HCU) or a vehicle control unit (VCU) of an electric vehicle. However, the invention is not limited thereto.

Hereinafter, the configuration of the torque calculation controller 100 will be described.

The torque calculation controller 100 may include a limit acceleration determination unit 110, a disturbance torque calculation unit 120, and an acceleration limit torque calculation unit 130.

The limit acceleration determination unit 110 may calculate a limit acceleration $a_{limit}$, which is the target of acceleration limit control, in consideration of a vehicle speed, a drive mode, an acceleration limit level set value, an accelerator pedal position sensor (APS) value, an APS variation ΔAPS, a road type, driving lane information, and road congestion.

The disturbance torque calculation unit 120 may calculate a disturbance torque) $\hat{d}(\hat{m})$ based on a slope θ, a vehicle speed $v$, and a driving torque $T_{wheel}$. Here, the disturbance torque $\hat{d}(\hat{m})$ may be a torque caused by a disturbance that affects the acceleration of the vehicle, other than the driving torque $T_{wheel}$ output from the driving source and transmitted to the wheels.

The acceleration limit torque calculation unit 130 may calculate a limit torque $T_{limiter}$, by which the acceleration of the vehicle is limited within the limit acceleration alma calculated by the limit acceleration determination unit 110, based on the disturbance torque $\hat{d}(\hat{m})$ calculated by the disturbance torque calculation unit 120.

The torque calculation controller 100 may output the smaller value, among the driver demand torque $T_{demand}$ and the limit torque $T_{limiter}$ calculated by the acceleration limit torque calculation unit 130, as the correction torque. Here, the correction torque may be input back to the disturbance torque calculation unit 120 as the driving torque $T_{wheel}$.

Hereinafter, the components of the torque calculation controller 100 will be described in more detail with reference to FIGS. 2 to 8.

First, the configuration and operation process of the limit acceleration determination unit 110 will be described with reference to FIGS. 2 to 6.

Figure 2:
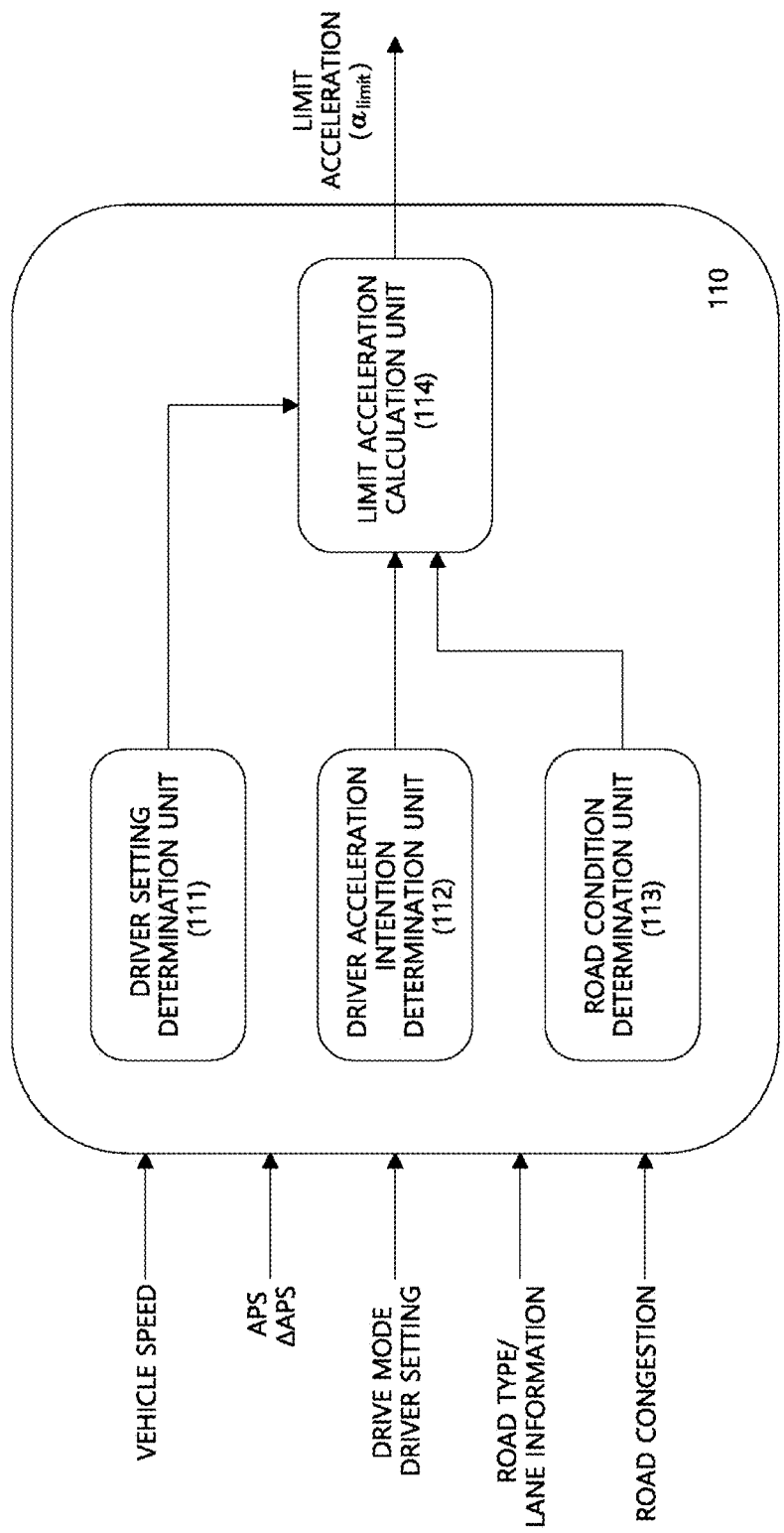
FIG. 2 illustrates an example of the configuration of a limit acceleration determination unit according to an embodiment of the present disclosure.

FIG. 2 illustrates an example of the configuration of the limit acceleration determination unit according to an embodiment of the present disclosure.

Referring to FIG. 2, the limit acceleration determination unit 110 may include a driver setting determination unit 111, a driver acceleration intention determination unit 112, a road condition determination unit 113, and a limit acceleration calculation unit 114.

The limit acceleration determination unit 110 may receive input information, such as a vehicle speed, a drive mode, an acceleration limit level set value, an accelerator pedal position sensor (APS) value, an APS variation ΔAPS, a road type, driving lane information, and road congestion. Information about the type of road and road congestion may be acquired from an audio/video/navigation (AVN) system, and driving lane information may take a form indicating whether the current driving lane is a passing lane by combining passing lane information included in (precise) map information with current lane information acquired from an advanced driver assistance system (ADAS). However, the invention is not limited thereto. With regard to the remaining input information, such as a vehicle speed and an APS value, the acquisition route or source thereof may be variously changed within the scope obvious to those skilled in the art (for example, a vehicle speed sensor or the driving source controller), and thus a description thereof will be omitted.

The driver setting determination unit 111 may turn off the acceleration limit function in a drive mode other than a specific mode (e.g. an ECO mode) based on the drive mode set by the driver, and may determine a base value of an acceleration limit level according to the setting by the driver in the ECO mode. This will be described with reference to FIG. 3.

Figure 3:
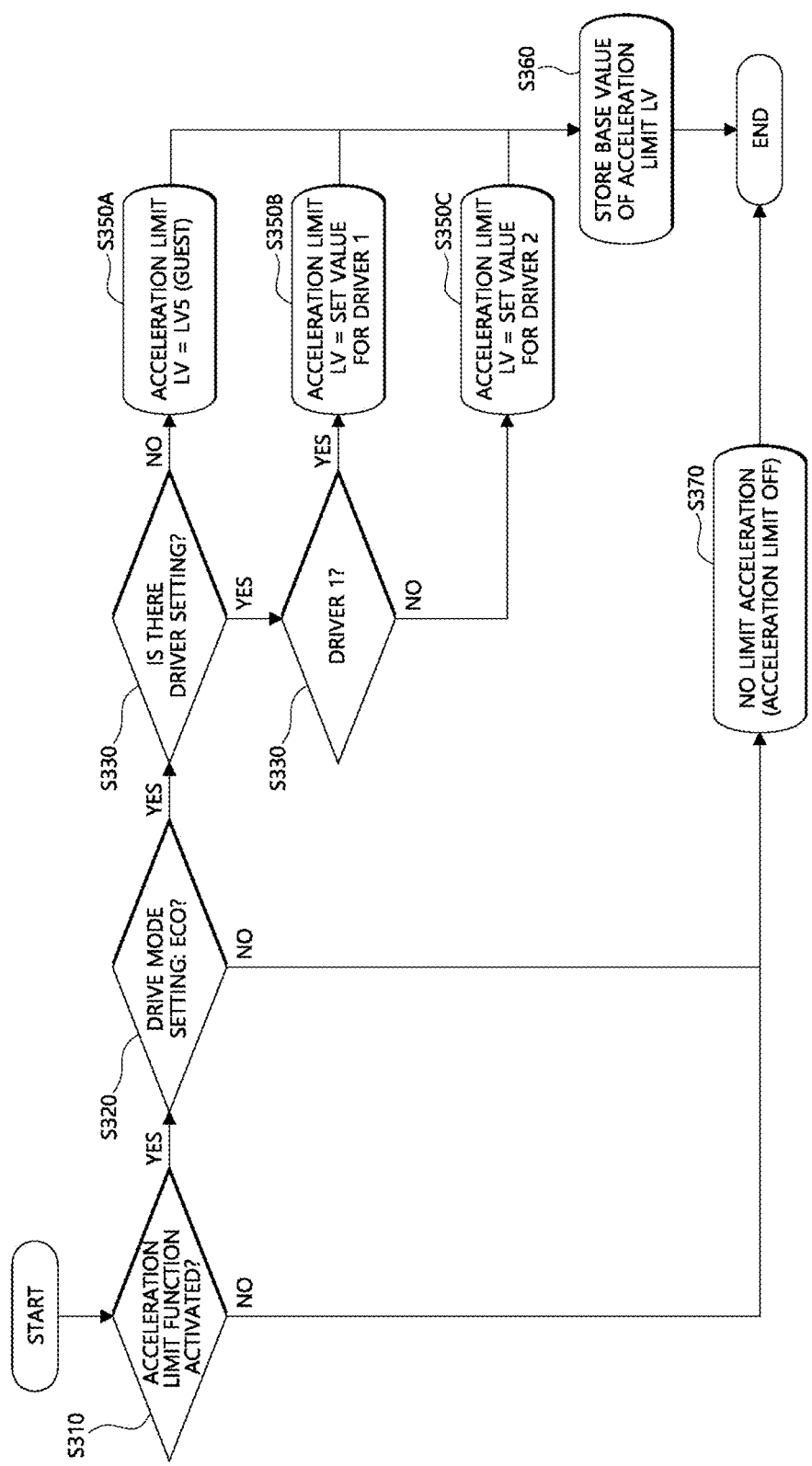
FIG. 3 is a flowchart showing an example of the operation process of a driver setting determination unit according to an embodiment of the present disclosure.

FIG. 3 is a flowchart showing an example of the operation process of the driver setting determination unit according to an embodiment of the present disclosure.

Referring to FIG. 3, when the acceleration limit function is activated (Yes in S310), the driver setting determination unit 111 checks the drive mode setting (S320).

When the drive mode is a predetermined specific mode (e.g. an ECO mode) (Yes in S320), the driver setting determination unit 111 checks a setting for each driver (S330). Here, the setting for each driver may be a setting related to various functions of the vehicle, which is stored as presets by each driver using an AVN system or a user setting menu (USM).

When there is no driver setting (No in S330), the acceleration limit level may be determined to be a level assigned to a guest by default (e.g. level 5) (S350A).

Meanwhile, when the currently set driver is a first driver (Yes in S340), the acceleration limit level may be determined according to the set value for the first driver (S350B). Similarly, when the currently set driver is a second driver (No in S340), the acceleration limit level may be determined according to the set value for the second driver (S350C).

When the acceleration limit level is determined through the above-described processes (S350A, S350B, and S350C), the driver setting determination unit 111 may store the determined acceleration limit level as the base value of the acceleration limit level (S360).

If the acceleration limit function is not activated (No in S310), or if the drive mode is not a predetermined specific mode (No in S320), the driver setting determination unit 111 may determine to turn off the acceleration limit function (S370).

Next, the driver acceleration intention determination unit 112 may determine the driver acceleration intention based on the APS value and the APS variation, and may determine a correction value, by which the acceleration limit level is increased or decreased, based on the driver acceleration intention. When the APS value is a predetermined value (e.g. 95% or more), which corresponds to a third threshold value to be described later, the driver acceleration intention determination unit 112 may determine that the driver intends to accelerate quickly, and may turn off the acceleration limit function based thereon. This will be described with reference to FIG. 4.

Figure 4:
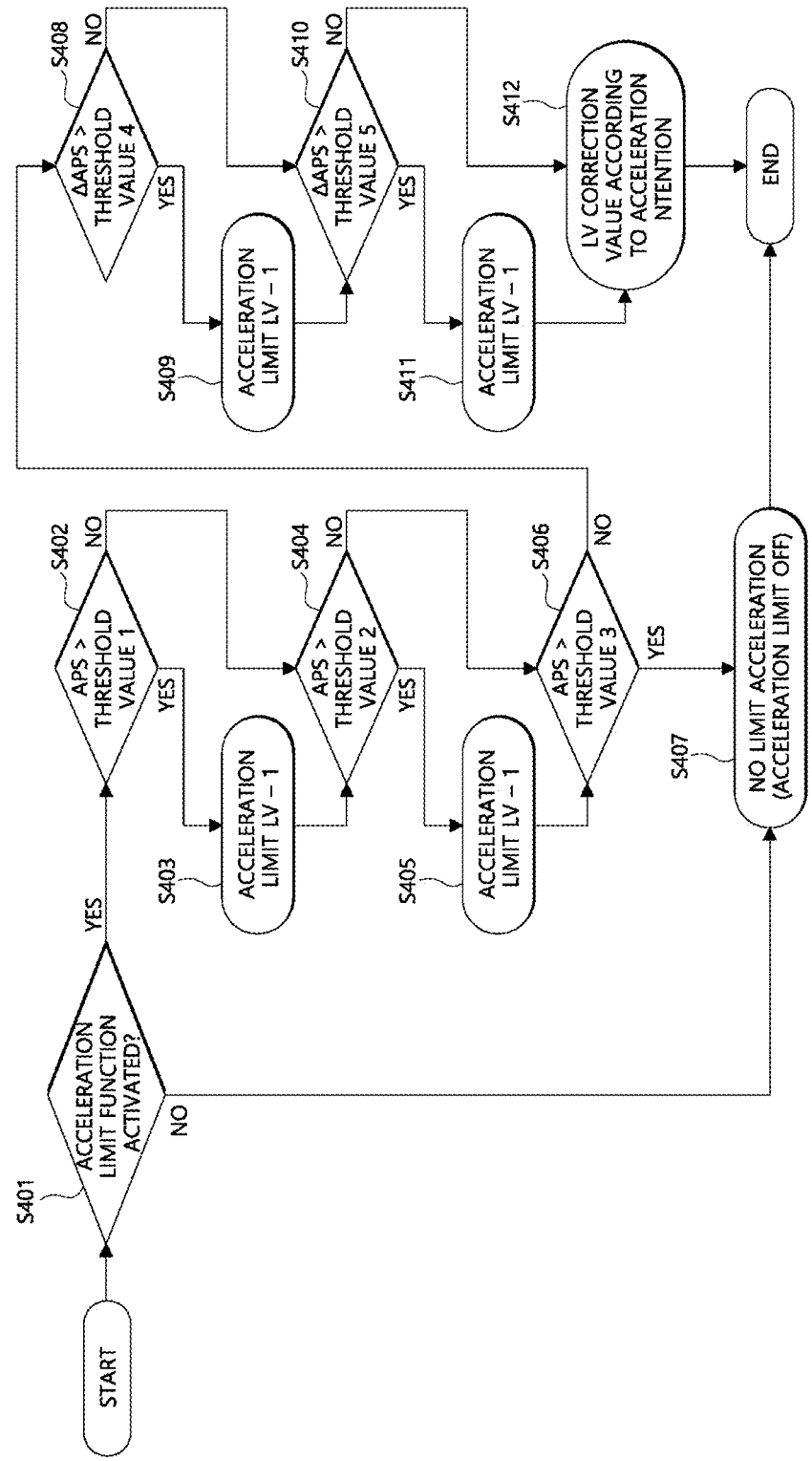
FIG. 4 is a flowchart showing an example of the operation process of a driver acceleration intention determination unit according to an embodiment of the present disclosure.

FIG. 4 is a flowchart showing an example of the operation process of the driver acceleration intention determination unit according to an embodiment of the present disclosure.

Referring to FIG. 4, when the acceleration limit function is activated (Yes in S401), the driver acceleration intention determination unit 112 determines whether the APS value is greater than a predetermined first threshold value (S402).

If the APS value is greater than the first threshold value (Yes in S402), the driver acceleration intention determination unit 112 applies −1 to an acceleration limit level correction value (S403).

In addition, the driver acceleration intention determination unit 112 determines whether the APS value is greater than a predetermined second threshold value (S404). Here, it is preferable for the second threshold value to be greater than the first threshold value.

If the APS value is greater than the second threshold value (Yes in S404), the driver acceleration intention determination unit 112 additionally applies −1 to the acceleration limit level correction value (S405).

In addition, the driver acceleration intention determination unit 112 determines whether the APS value is greater than a predetermined third threshold value (S406). Here, it is preferable for the third threshold value to be greater than the second threshold value.

If the APS value is greater than the third threshold value (Yes in S406), the driver acceleration intention determination unit 112 may determine that there is no limit acceleration, that is, may determine to turn off the acceleration limit function based on the driver's intention to accelerate quickly (S407).

If the APS value is equal to or less than the third threshold value (No in S406), the driver acceleration intention determination unit 112 determines whether the APS variation per unit time ΔAPS is greater than a predetermined fourth threshold value (S408). Here, the fourth threshold value is for ΔAPS, rather than the APS value itself, and may not be related to the first to third threshold values.

If ΔAPS is greater than the fourth threshold value (Yes in S408), the driver acceleration intention determination unit 112 additionally applies −1 to the acceleration limit level correction value (S409).

In addition, the driver acceleration intention determination unit 112 determines whether ΔAPS is greater than a predetermined fifth threshold value (S410). Here, it is preferable for the fifth threshold value to be greater than the fourth threshold value.

If ΔAPS is greater than the fifth threshold value (Yes in S410), the driver acceleration intention determination unit 112 additionally applies −1 to the acceleration limit level correction value (S411).

Thereafter, the driver acceleration intention determination unit 112 may determine a final accumulation value of the acceleration limit level correction values, which are obtained according to the driver's acceleration intention, to be the correction value (S412).

Next, the road condition determination unit 113 may determine a correction value for the acceleration limit level based on whether the current driving road is a specific road on which the vehicle can travel at a relatively high speed (e.g. an expressway or an interstate highway), on whether the current driving lane is a passing lane, and on road congestion. This will be described with reference to FIG. 5.

Figure 5:
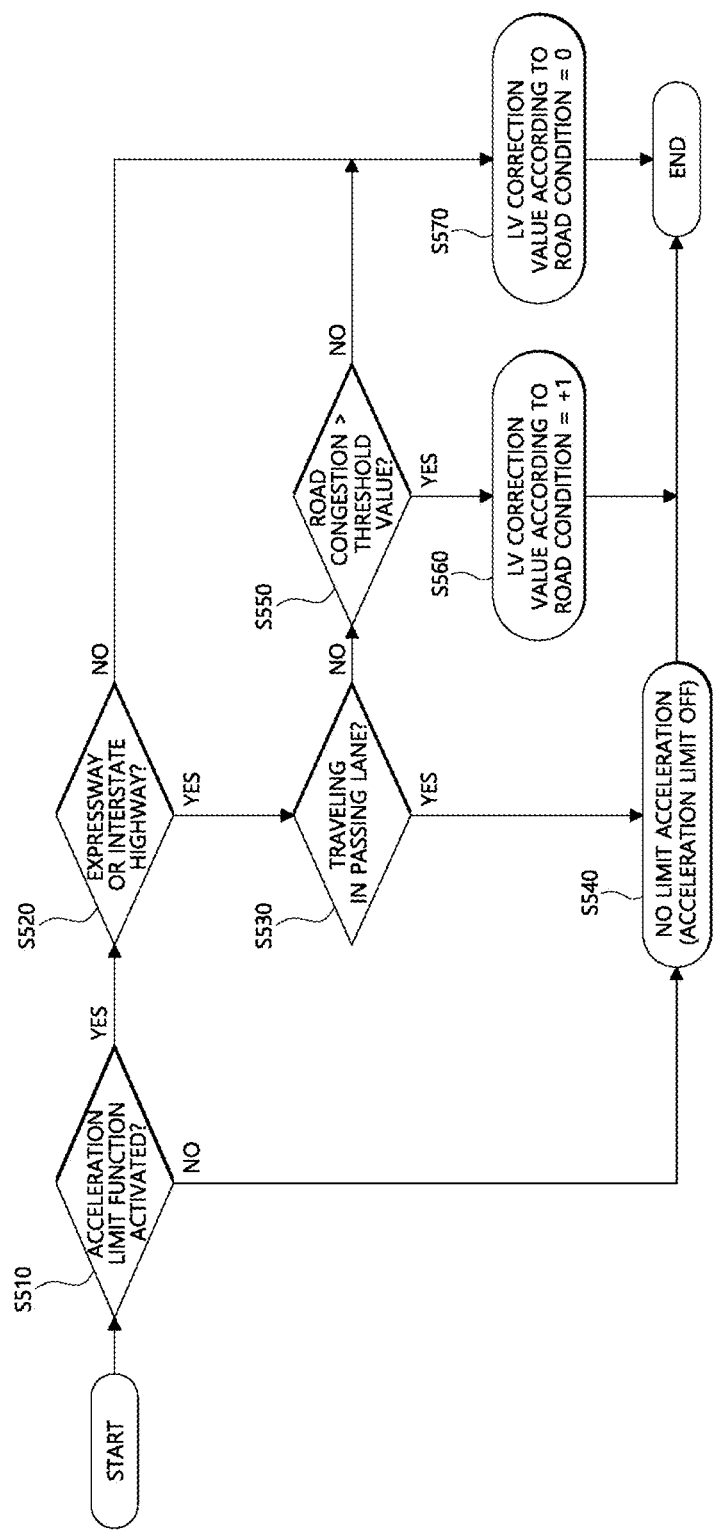
FIG. 5 is a flowchart showing an example of the operation process of a road condition determination unit according to an embodiment of the present disclosure.

FIG. 5 is a flowchart showing an example of the operation process of the road condition determination unit according to an embodiment of the present disclosure.

Referring to FIG. 5, when the acceleration limit function is activated (Yes in S510), the road condition determination unit 113 determines whether the current driving road corresponds to a predetermined specific road type (e.g. an expressway or an interstate highway) (S520).

If the current driving road corresponds to a specific road type (Yes in S520), the road condition determination unit 113 may determine whether the current driving lane is a passing lane (S530).

If the current driving lane is a passing lane (Yes in S530), the road condition determination unit 113 may determine that there is no limit acceleration, that is, may determine to turn off the acceleration limit function (S540) because the vehicle needs to be capable of smoothly accelerating.

Meanwhile, if the current driving lane is not a passing lane (No in S530), the road condition determination unit 113 may determine the state of road congestion (S550). The determination of road congestion may use real-time traffic information, or may use information acquired through a sensor, such as a vision sensor, RADAR, or LIDAR, but the invention is not limited thereto.

If the road congestion is greater than a predetermined threshold value (Yes in S550), the road condition determination unit 113 may apply +1 to the acceleration limit level correction value in consideration of the road condition (S560). If the road congestion is less than or equal to the threshold value (No in S550), or if the current driving road does not correspond to a specific road type (No in S520), the road condition determination unit 113 may not modify the acceleration limit level correction value (S570).

Next, the limit acceleration calculation unit 114 may determine a final acceleration limit level by combining the acceleration limit level correction value of the driver acceleration intention determination unit 112 and the acceleration limit level correction value of the road condition determination unit 113 with the base value of the acceleration limit level of the driver setting determination unit 111, and may calculate a limit acceleration value alma based thereon. Here, when determining the final acceleration limit level, the limit acceleration calculation unit 114 may additionally apply a maximum/minimum range to the value obtained by applying the correction value to the base value. When any one of the determination units 111, 112, and 113 determines to turn off the acceleration limit function, the limit acceleration calculation unit 114 may not calculate the limit acceleration, or may finally determine to turn off the acceleration limit function. This will be described with reference to FIG. 6.

Figure 6:
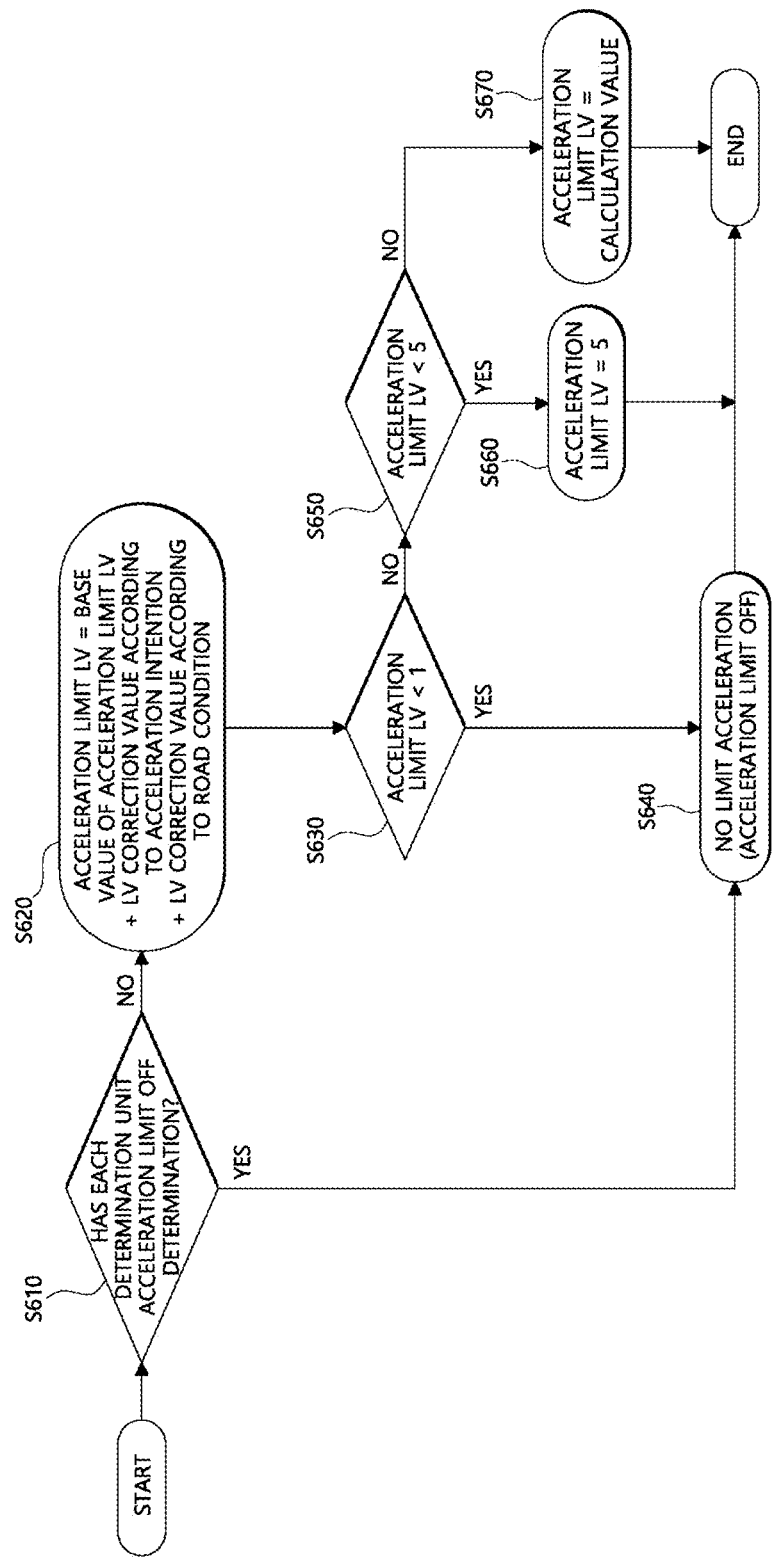
FIG. 6 is a flowchart showing an example of the operation process of a limit acceleration calculation unit according to an embodiment of the present disclosure.

FIG. 6 is a flowchart showing an example of the operation process of the limit acceleration calculation unit according to an embodiment of the present disclosure.

Referring to FIG. 6, the limit acceleration calculation unit 114 may first determine whether each of the determination units 111, 112, and 113 has determined to turn off the acceleration limit function (S610). If there is no determination history (No in S610), the limit acceleration calculation unit 114 may combine the acceleration limit level correction value of the driver acceleration intention determination unit 112, the acceleration limit level correction value of the road condition determination unit 113, and the base value of the acceleration limit level of the driver setting determination unit 111 (S620).

If the acceleration limit level obtained through the combination is less than 1 (Yes in S630), the limit acceleration calculation unit 114 may determine to turn off the acceleration limit function (S640).

If the acceleration limit level obtained through the combination is equal to or greater than 1 (No in S630), the limit acceleration calculation unit 114 determines whether the acceleration limit level is greater than a maximum value (here, 5) (S650). If the acceleration limit level is greater than the maximum value, the limit acceleration calculation unit 114 may set the acceleration limit level to the maximum value (i.e. 5) (S660).

Meanwhile, if the acceleration limit level ranges from 1 to the maximum value (No in S650), the limit acceleration calculation unit 114 may determine the acceleration limit level calculated in step S620 to be the final acceleration limit level (S670).

When the acceleration limit level is finally determined, the limit acceleration calculation unit 114 may output a limit acceleration value $a_{limit}$ corresponding to the determined acceleration limit level.

The above-described process of determining the final acceleration limit level by the limit acceleration calculation unit 114 will be specifically described below by way of example.

[Case 1]

Drive mode=Eco, Base level set by first occupant=3

Correction value based on APS value=−2, Correction value based on ΔAPS=−1

Driving road=Expressway, Road congestion>Threshold value

In the above situation, the base value of the acceleration limit level of the driver setting determination unit 111 becomes 3, the acceleration limit level correction value of the driver acceleration intention determination unit 112 becomes −3, and the acceleration limit level correction value of the road condition determination unit 113 becomes +1. Because +1 is neither less than 1 nor greater than the maximum level, the final acceleration limit level may be determined to be 1.

[Case 2]

Drive mode=Eco, Occupant=Guest

Correction value based on APS value=−2, Correction value based on ΔAPS=−1

Driving road=Expressway, Lane information=Passing lane

In the above situation, the base value of the acceleration limit level of the driver setting determination unit 111 becomes 5, and the acceleration limit level correction value of the driver acceleration intention determination unit 112 becomes −3. However, because the vehicle is traveling in a passing lane on an expressway, the road condition determination unit 113 determines to turn off the acceleration limit function. Accordingly, the limit acceleration calculation unit 114 determines to turn off the acceleration limit function.

Hereinafter, the disturbance torque calculation unit 120 and the acceleration limit torque calculation unit 130 will respectively be described with reference to FIGS. 7 and 8.

Figure 7:
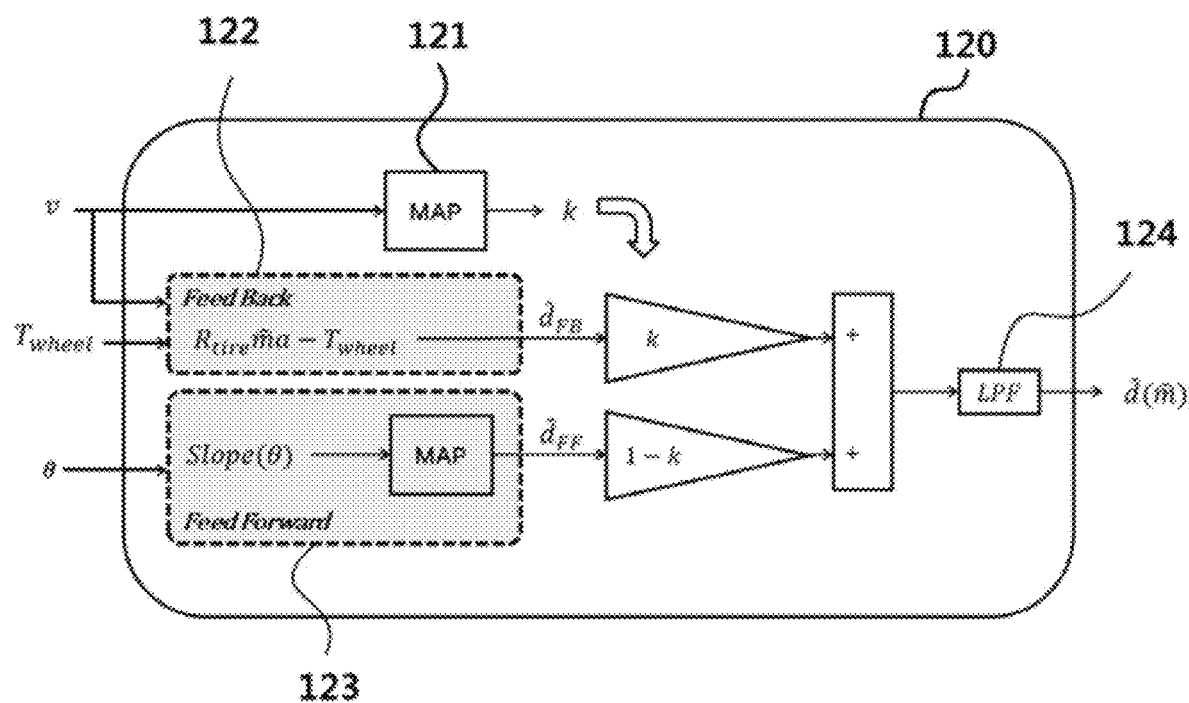
FIG. 7 illustrates an example of the configuration of a disturbance torque calculation unit according to an embodiment of the present disclosure.

FIG. 7 illustrates an example of the configuration of the disturbance torque calculation unit according to an embodiment of the present disclosure.

In order to effectively limit the acceleration of the vehicle, it is necessary to calculate a disturbance torque $\hat{d}(\hat{m})$. The disturbance torque $\hat{d}(\hat{m})$ may broadly be calculated through two methods. The first method is a feedforward method, which uses rolling resistance and air resistance preset according to a vehicle speed v and determined through a coasting test. This method is not capable of fully taking into account the effects of weather, such as wind, rain, or snow, a change in the mass of the vehicle, the state of tires, such as tire air pressure, and road surface conditions, and may thus be inaccurate in some cases. The second method is a feedback method, which calculates disturbance in real time based on the output and acceleration of the vehicle using the law of force and acceleration ($F_{whl}-d=ma$). Here, the acceleration may be obtained through differentiation of the vehicle speed, and an estimated mass $\hat{m}$ may be used as the mass of the vehicle. The estimated mass may be calculated by adding a predetermined weight to the empty vehicle weight, or may be estimated according to the law of force and acceleration on flat ground. However, the invention is not limited thereto. In this feedback method, when the vehicle speed is 0, the output and the disturbance become equal to each other, and thus a large error may occur when stopped or traveling at low speed.

In order to solve the problems with the two methods described above, the disturbance torque calculation unit 120 according to this embodiment determines the ratio of the feedforward method to the feedback method according to the vehicle speed, and sums the values obtained through the two methods.

To this end, the disturbance torque calculation unit 120 may include a gain calculation unit 121 provided with a map defining a gain value k corresponding to the vehicle speed v, a feedback calculation unit 122 calculating feedback disturbance $\hat{d}^{FB}$, a feedforward calculation unit 123 calculating feedforward disturbance $\hat{d}_{FF}$, and a low-pass filter 124.

For example, when the vehicle is in a stopped state, the disturbance torque calculation unit 120 may set the gain value k to 0, and may use only the feedforward disturbance $\hat{d}_{FF}$. Thereafter, as the vehicle speed increases, the gain value k may increase to 1 according to the map of the first gain calculation unit 121, and accordingly, the proportion of the feedback disturbance $\hat{d}_{FB}$ may increase. That is, the map of the gain calculation unit 121 may have a form in which the gain value k starts from 0 when the vehicle is in a stopped state (i.e. vehicle speed=0) and increases so as to reach 1 when the vehicle speed exceeds a predetermined value.

Since the feedforward disturbance FF is mainly used only in a low-speed situation, air resistance may be ignored, and a disturbance value predefined in the form of a map for the slope θ through testing may be used in consideration of climbing/descending resistance and rolling resistance. Accordingly, even when the vehicle starts traveling uphill, the disturbance may be appropriately compensated for, and thus the acceleration of the vehicle may be effectively limited.

The low-pass filter 124 may prevent a sudden change in the disturbance torque from being transmitted to the acceleration limit torque calculation unit 130.

Figure 8:
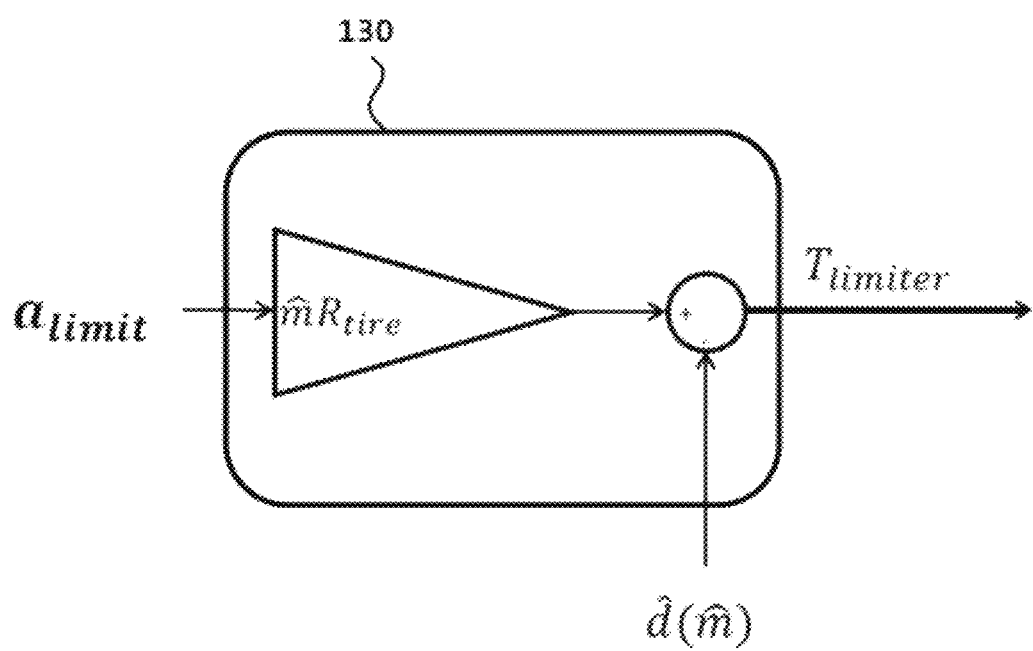
FIG. 8 illustrates an example of the configuration of an acceleration limit torque calculation unit according to an embodiment of the present disclosure.

FIG. 8 illustrates an example of the configuration of the acceleration limit torque calculation unit according to an embodiment of the present disclosure.

Referring to FIG. 8, the acceleration limit torque calculation unit 130 may calculate the acceleration torque by multiplying the product of the estimated mass $\hat{m}$ of the vehicle and a tire dynamic radius $R_{tire}$ by the limit acceleration $a_{limit}$. The acceleration limit torque calculation unit may calculate the limit acceleration torque $T_{limiter}$ by compensating for the acceleration torque using the disturbance torque $\hat{d}(\hat{m})$. The reason for performing compensation using the disturbance torque $\hat{d}(\hat{m})$ is as follows.

If the estimated mass $\hat{m}$ is accurate and there is no disturbance, the vehicle may accelerate at the limit acceleration $a_{limit}$ when the acceleration torque is output. However, in practice, there may be a disturbance, and the estimated mass $\hat{m}$ may be different from the actual mass, so it is difficult for the vehicle to run at the set limit acceleration. In order to solve this, the acceleration torque is compensated using the disturbance torque $\hat{d}(\hat{m})$, and accordingly, the vehicle is capable of running at the set limit acceleration $a_{limit}$ regardless of the disturbance or the error of the estimated mass $\hat{m}$.

As the acceleration limit torque calculation unit 130 calculates the limit acceleration torque $T_{limiter}$, which is obtained through compensation using the disturbance torque, the torque calculation controller 100 may obtain a minimum value MIN between the driver demand torque $T_{demand}$, which is determined based on driver manipulation of the accelerator pedal, i.e. the APS value, and the limit acceleration torque $T_{limiter}$, and may output the minimum value MIN as the final correction torque.

Accordingly, torque is limited only when the vehicle is accelerated beyond the set limit acceleration $a_{limit}$ by the driver demand torque $T_{demand}$. Accordingly, it is possible to effectively limit acceleration while preventing the vehicle from rolling backwards on an uphill slope.

Meanwhile, in the above-described embodiments, the base value of the acceleration limit level may be set and changed through predetermined menu manipulation by the user. This will be described with reference to FIG. 9.

Figure 9:
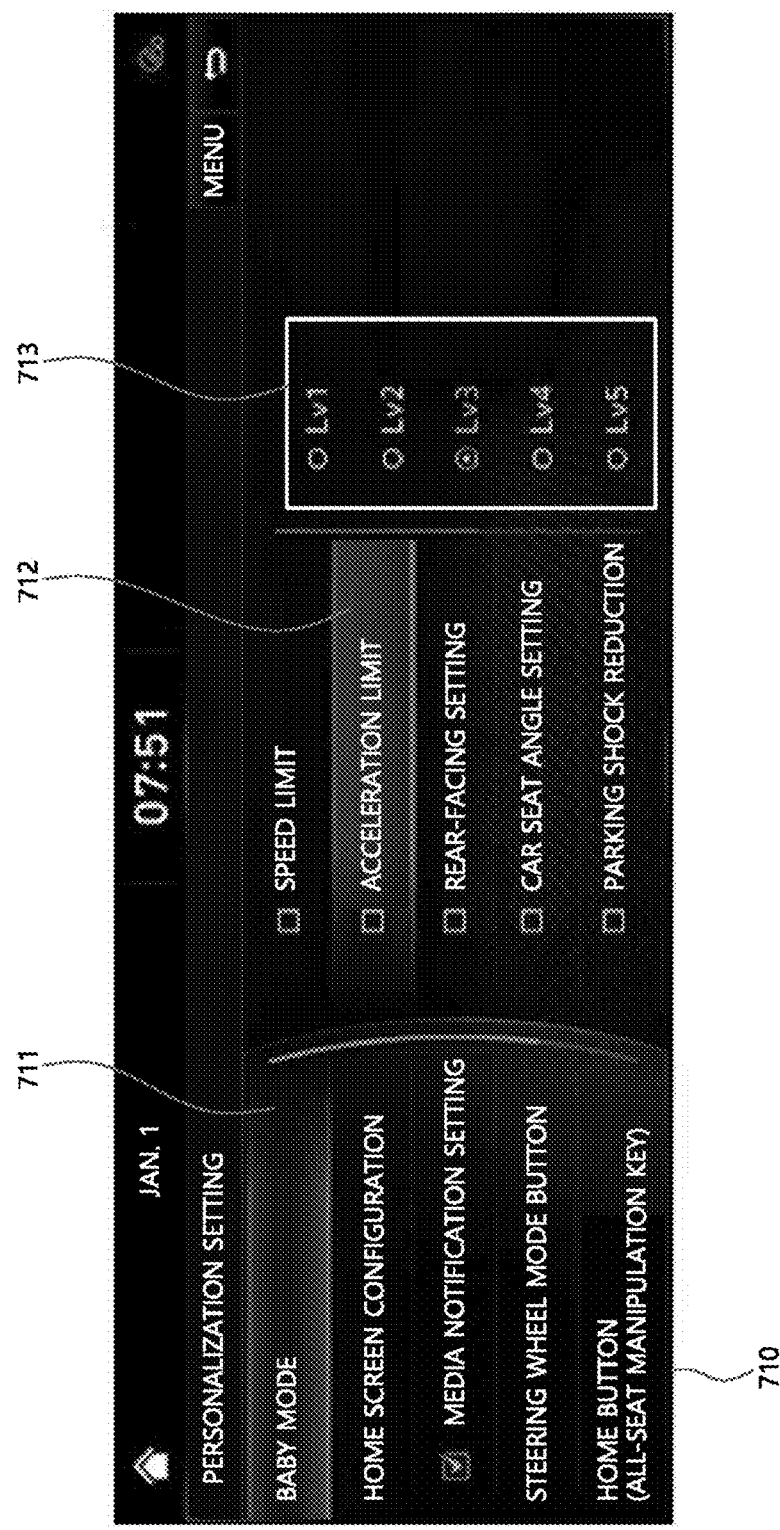
FIG. 9 illustrates an example of the configuration of a mode setting menu according to an embodiment of the present disclosure.

FIG. 9 illustrates an example of the configuration of a mode setting menu according to an embodiment of the present disclosure.

Referring to the upper part of FIG. 9, a user setting menu (USM) is displayed on a display 710 of an AVN system. When a baby mode 711, which is displayed on the left in the USM, is selected, the user may select an acceleration limit function 712 from a lower-level menu displayed in the middle of the USM. When the acceleration limit function 712 is selected, the user may select a base value 713 of the acceleration limit level from a lower-level menu displayed on the right in the USM.

Of course, this menu configuration is merely exemplary, and may be modified such that the user is capable of setting the base value of the acceleration limit level in a mode other than the baby mode 711 or in another independent higher-level menu.

Meanwhile, the acceleration limit control method according to the embodiments described above may be temporarily deactivated depending on the circumstances. For example, the situation in which an emergency light is turned on, a turn signal is turned on, a blind spot warning is output, or an impact is detected corresponds to an emergency situation, an overtaking situation, or a situation requiring high driving force, and the acceleration limit may be deactivated in such a situation.

The present invention may be implemented as code that can be written on a computer-readable recording medium and thus read by a computer system. The computer-readable recording medium includes all kinds of recording devices in which data that may be read by a computer system are stored. Examples of the computer-readable recording medium include a Hard Disk Drive (HDD), a Solid-State Disk (SSD), a Silicon Disk Drive (SDD), Read-Only Memory (ROM), Random Access Memory (RAM), Compact Disk ROM (CD-ROM), a magnetic tape, a floppy disc, and an optical data storage.

As is apparent from the above description, a vehicle related to at least one embodiment of the present disclosure configured as described above may provide a more effective acceleration limit function.

Particularly, an acceleration limit level is determined in comprehensive consideration of a driver's intention and a driving environment, thereby improving driving convenience.

However, the effects achievable through the present invention are not limited to the above-mentioned effects, and other effects not mentioned herein will be clearly understood by those skilled in the art from the above description.

It will be apparent to those skilled in the art that various changes in form and details may be made without departing from the spirit and essential characteristics of the invention set forth herein. Accordingly, the above detailed description is not intended to be construed to limit the invention in all aspects and to be considered by way of example. The scope of the invention should be determined by reasonable interpretation of the appended claims and all equivalent modifications made without departing from the invention should be included in the following claims.

What is claimed is:

1. An acceleration limit control method comprising:
   determining a base value of an acceleration limit level, the acceleration limit level being classified into a plurality of levels;
   determining a first correction value based on manipulation of an accelerator pedal;
   determining a second correction value based on a driving environment;
   determining a final acceleration limit level by applying the first correction value and the second correction value to the base value; and
   determining a limit acceleration based on the final acceleration limit level.

2. The acceleration limit control method of claim 1, wherein the determining a base value comprises determining the base value according to a setting for each driver when a drive mode corresponds to a predetermined mode.

3. The acceleration limit control method of claim 1, wherein the determining a first correction value comprises:
   determining a 1-$1^{st}$ correction value according to an accelerator pedal position sensor (APS) value; and
   determining a 1-$2^{nd}$ correction value according to a variation ($\Delta$APS) in the accelerator pedal position sensor value.

4. The acceleration limit control method of claim 1, wherein the determining a second correction value is performed based on at least one of whether a current driving road corresponds to a specific road type, whether a current driving lane is a passing lane, or whether road congestion is greater than a threshold value.

5. The acceleration limit control method of claim 4, wherein the determining a second correction value comprises increasing the second correction value when the current driving road corresponds to the specific road type, when the current driving lane is not a passing lane, and when the road congestion is greater than the threshold value.

6. The acceleration limit control method of claim 1, further comprising:
   turning off an acceleration limit function when an acceleration limit off determination is made in at least one of the determining a base value, the determining a first correction value, or the determining a second correction value.

7. The acceleration limit control method of claim 1, further comprising:
   determining a limit torque satisfying the limit acceleration based on a disturbance torque caused by a disturbance other than a driving source of a vehicle; and
   determining an output torque to be output from the driving source based on the limit torque and a driver demand torque.

8. The acceleration limit control method of claim 7, wherein the determining a disturbance torque comprises:
   obtaining a feedback disturbance torque based on the output torque and a vehicle speed;
   obtaining a feedforward disturbance torque based on a slope; and
   determining the disturbance torque based on the feedback disturbance torque and the feedforward disturbance torque.

9. The acceleration limit control method of claim 8, wherein the determining the disturbance torque based on the feedback disturbance torque and the feedforward disturbance torque comprises:
   multiplying the feedback disturbance torque by a gain determined according to a vehicle speed; and
   multiplying the feedforward disturbance torque by a value obtained by subtracting the gain from 1.

10. A non-transitory computer-readable recording medium storing a program configured to execute the acceleration limit control method of claim 1.

11. A vehicle comprising:
    a driving source;
    a torque calculation controller configured to determine a limit acceleration and to determine an output torque to be output from the driving source based on the determined limit acceleration; and
    a driving source controller configured to control the driving source based on the output torque,
    wherein the torque calculation controller comprises:
    a first determination unit configured to determine a base value of an acceleration limit level, the acceleration limit level being classified into a plurality of levels;
    a second determination unit configured to determine a first correction value based on manipulation of an accelerator pedal;
    a third determination unit configured to determine a second correction value based on a driving environment; and
    a calculation unit configured to determine a final acceleration limit level by applying the first correction value and the second correction value to the base value and to calculate the limit acceleration based on the final acceleration limit level.

12. The vehicle of claim 11, wherein the first determination unit determines the base value according to a setting for each driver when a drive mode corresponds to a predetermined mode.

13. The vehicle of claim 11, wherein the second determination unit determines the first correction value based on a sum of a 1-1$^{st}$ correction value according to an accelerator pedal position sensor (APS) value and a 1-2$^{nd}$ correction value according to a variation (ΔAPS) in the accelerator pedal position sensor value.

14. The vehicle of claim 11, wherein the third determination unit determines the second correction value based on at least one of whether a current driving road corresponds to a specific road type, whether a current driving lane is a passing lane, or whether road congestion is greater than a threshold value.

15. The vehicle of claim 14, wherein the third determination unit increases the second correction value when the current driving road corresponds to the specific road type, when the current driving lane is not a passing lane, and when the road congestion is greater than the threshold value.

16. The vehicle of claim 11, wherein the calculation unit turns off an acceleration limit function when at least one of the first determination unit, the second determination unit, or the third determination unit makes an acceleration limit off determination.

17. The vehicle of claim 11, wherein the torque calculation controller determines a limit torque satisfying the limit acceleration based on a disturbance torque caused by a disturbance other than the driving source, and determines the output torque based on the limit torque and a driver demand torque.

18. The vehicle of claim 17, wherein the torque calculation controller obtains a feedback disturbance torque based on the output torque and a vehicle speed, obtains a feedforward disturbance torque based on a slope, and determines the disturbance torque based on the feedback disturbance torque and the feedforward disturbance torque.

19. The vehicle of claim 18, wherein the torque calculation controller determines the disturbance torque based on a value obtained by multiplying the feedback disturbance torque by a gain determined according to a vehicle speed and a value obtained by multiplying the feedforward disturbance torque by a value obtained by subtracting the gain from 1.

* * * * *